US005926580A

United States Patent [19]

McCoy

[11] Patent Number: 5,926,580

[45] Date of Patent: Jul. 20, 1999

[54] CONVOLUTION ALGORITHM FOR EFFICIENT HARDWARE IMPLEMENTATION

[75] Inventor: J. Scott McCoy, San Marcos, Calif.

[73] Assignee: Hewlett-Packard Company, Palo Alto, Calif.

[21] Appl. No.: 08/791,237

[22] Filed: Jan. 30, 1997

[51] Int. Cl.[6] .......... G06K 9/64

[52] U.S. Cl. .......... 382/279; 364/728.01

[58] Field of Search .......... 382/276, 279, 382/277, 278; 364/724.12, 724.011, 728.01, 819, 820, 824

[56] References Cited

U.S. PATENT DOCUMENTS

| | | | |
|---|---|---|---|
| 3,980,873 | 9/1976 | Mattei | 364/724.12 |
| 4,328,425 | 5/1982 | Stoffel | 250/208.1 |
| 4,328,426 | 5/1982 | D'Ortenzio | 382/277 |
| 4,821,108 | 4/1989 | Barbagelata et al. | 382/272 |
| 4,866,648 | 9/1989 | Usui | 364/724.011 |
| 4,918,742 | 4/1990 | Simonds | 382/304 |
| 4,984,286 | 1/1991 | Dolazza | 382/279 |
| 5,031,132 | 7/1991 | Dolazza | 364/724.12 |
| 5,258,771 | 11/1993 | Murakami et al. | 382/271 |
| 5,500,811 | 3/1996 | Corry | 364/724.16 |
| 5,661,822 | 8/1997 | Knowles et al. | 382/233 |

*Primary Examiner*—Jon Chang
*Assistant Examiner*—Jingge Wu
*Attorney, Agent, or Firm*—Jerry R. Potts

[57] ABSTRACT

A system and method for performing a discrete image convolution using convolution masks that are symmetric in both cardinal directions. The method is used in an image processor. The advantage of the convolution processing in accordance with the invention is the reduction in the number of multiply operations. With the convolution having symmetry in both m and n, the convolution processing minimizes the number of multiple operations in the following manner:

$$c(x, y) = \sum_{j=0}^{(m-1)/2} \sum_{j=0}^{(n-1)/2} f(i, j)[g(x+i, y+j) + g(x+i, y-j) + g(x-i, y+j) + g(x-i, y-j)]$$

where c(x,y) is the convolved image array, f(m,n) is the convolution mask, and g(x,y) is the image array to be processed. The invention reduces the number of multiply operations to convolve g(x,y) with f(m,n) by up to a factor of four, to (m+1)(n+1)/4, in relation to conventional image convolution processing.

12 Claims, 4 Drawing Sheets

CONVOLUTION ALGORITHM FOR EFFICIENT HARDWARE IMPLEMENTATION

TECHNICAL FIELD OF THE INVENTION

This invention relates to image processing, and more particularly to apparatus and methods for reducing the number of convolution multiply operations.

BACKGROUND OF THE INVENTION

Digital image processing typically employs two dimensional image convolutions. The standard form for a discrete two-dimensional image convolution is $$c(x, y) = \sum_{i=(1-m)/2}^{(m-1)/2} \sum_{j=(1-n)/2}^{(n-1)/2} f(i, j)g(x-i, y-j)$$

where f(m,n) is the convolution mask, and g(x,y) is the image array to be processed. An implementation of this function would require $$xymn - \sum_{i=1}^{(m-1)/2} ixm - \sum_{j=1}^{(n-1)/2} jyn$$

multiply operations to convolve g(x,y) with f(m,n). If the quantity (x)(y) is much greater than the quantity (m)(n), this can be approximated by (m)(n)(x)(y).

It would therefore represent an advance in the art to provide a two-dimensional image convolution which requires a reduced number of multiple operations.

SUMMARY OF THE INVENTION

A method is described for convolving an image frame comprising a two-dimensional array of pixel values by a desired linear convolution mask that is symmetric in both cardinal directions, while reducing the number of multiply operations employed in the convolution. According to one aspect of the invention, the method includes the following steps:

reading input image data including an image pixel value for an image pixel to be convolved and a set of image pixel values corresponding to a set of pixels surrounding the image pixel to be convolved;

convolving the image pixel by applying a set of mask coefficients to the image pixel values for the pixel to be convolved and the set of surrounding pixels, the convolving step exploiting the symmetry in the convolution mask to employ only a reduced number of multiplication operations to perform the convolution; and repeating the steps of reading input image data and convolving the image pixel for each pixel in a set of image pixels comprising the image frame to provide a convolved image frame, wherein a highly efficient convolution is obtained with efficient utilization of multiply operations.

In accordance with a further aspect of the invention, the set of surrounding image pixels includes pixels disposed in each quadrant of a two-dimensional mask set surrounding the image pixel to be convolved, and the convolving step comprises:

(i) selecting a first subset of the set of surrounding image pixels consisting of four corresponding image pixels from each quadrant disposed equidistantly from the image pixel to be convolved;

(ii) summing the pixel values of the subset of surrounding image pixels to form a summed value;

(iii) multiplying the summed value by a filter mask value corresponding to the subset to form a first product value;

(iv) selecting a subsequent subset of the set of surrounding image pixels consisting of four corresponding image pixels from each quadrant disposed equidistantly from the image pixel to be convolved and which have not already been selected to form a subset;

(v) summing the pixel values of the subsequent subset of surrounding image pixels to form a subsequent summed value;

(vi) multiplying the subsequent summed value by a filter mask value corresponding to the subsequent subset to form a second product value;

(vii) forming an accumulated value comprising the sum of the product values formed for each multiplication process; and (vii) repeating steps (iv) through (vii) to obtain an accumulated value formed from all pixels in the set of surrounding pixels.

According to another aspect of the invention, the convolving step comprises grouping pixel values of four corresponding image pixels comprising the set of surrounding image pixels, and performing multiply operations on the grouped pixel values, wherein in general the number of multiply operations is (m+1)(n+1)/4, where the filter mask is m by n pixels in size.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
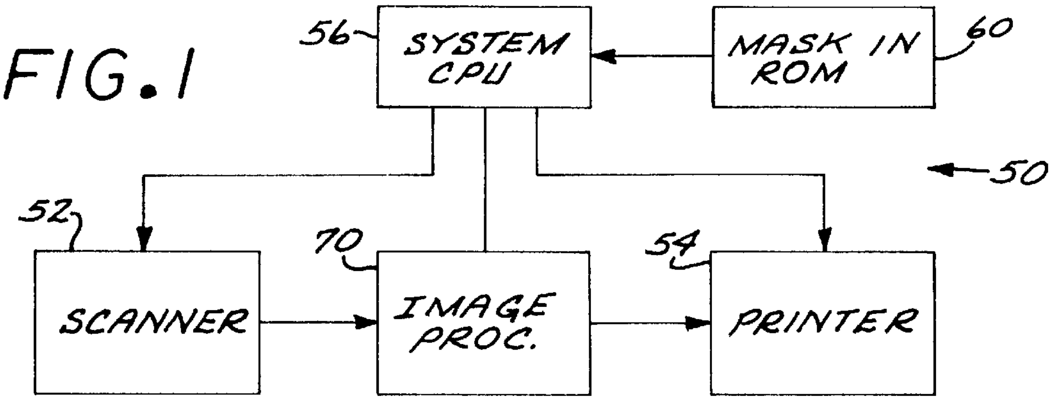
FIG. 1 is a schematic block diagram of a digital copier system in which the invention is advantageously employed.

A preferred application for this invention is in a color copier apparatus. FIG. 1 shows a simplified schematic diagram of a digital color copier system 50 embodying the invention. An optical color scanner section 52 provides a means of optically scanning a document which is to be reproduced. The scanner output is a digitized representation of the image scanned by the scanner. The scanner section per se can be of a type well known in the art.

The scanner output is processed by an image processor 70, which processes the digitized representation provided by the scanner section 52 and produces print data signals for providing data signals to the printer section 54. The printer section 54 is a color printer apparatus, such as a color laser printer or ink-jet printer.

The scanner section 52, image processor 70 and printer 54 operate under overall control of the system CPU 56. A ROM memory 60 provides data used in the system operation, including mask data employed in the image processing function performed by the image processor 70, as discussed below.

Figure 2:
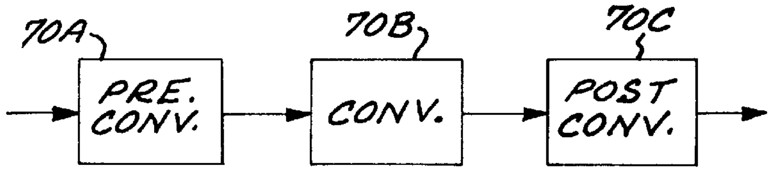
FIG. 2 is a simplified block diagram illustrating in a general sense the image processor of the digital copier of FIG. 1.

One of the functions performed by the image processor 70 is a discrete two-dimensional image convolution 70B, which is a linear spatial domain filtering process. In a general sense, the image processor performs additional processing functions, which are shown in FIG. 2 as pre-convolution processing functions 70A and post-convolution processing functions 70C. In this exemplary implementation of the invention in a color copier, the image convolution employs a high pass filter to sharpen the image. In such an exemplary application, the pre-convolution processing can include scanner compensation processing and color space conversion, and the post-convolution processing can include half-toning processing. The invention is not limited to this implementation, but in general can be applied to two-dimensional convolution processes that are symmetric in both cardinal directions. The advantage of the convolution processing in accordance with the invention is the reduction in the number of multiply operations, relative to conventional two-dimensional convolution operations.

The reduction in multiplication operations is achieved by exploiting the m and n symmetry in f(m,n), the convolution mask, i.e.:

$$f(m,n)=f(m,-n)=f(-m,n)=f(-m,-n)$$

The symmetry permits the modification of the convolution processing to minimize the number of multiply operations:

$$c(x, y) = \sum_{i=0}^{(m-1)/2} \sum_{j=0}^{(n-1)/2} f(i, j)[g(x+i, y+j) + g(x+i, y-j) + g(x-i, y+j) + g(x-i, y-j)]$$

where c(x,y) is the convolved image array, f(m,n) is the convolution mask, and g(x,y) is the image array to be processed.

The invention reduces the number of multiply operations to convolve g(x,y) with f(m,n) by up to a factor of four, to (m+1)(n+1)/4, in relation to conventional image convolution processing.

Figure 3:
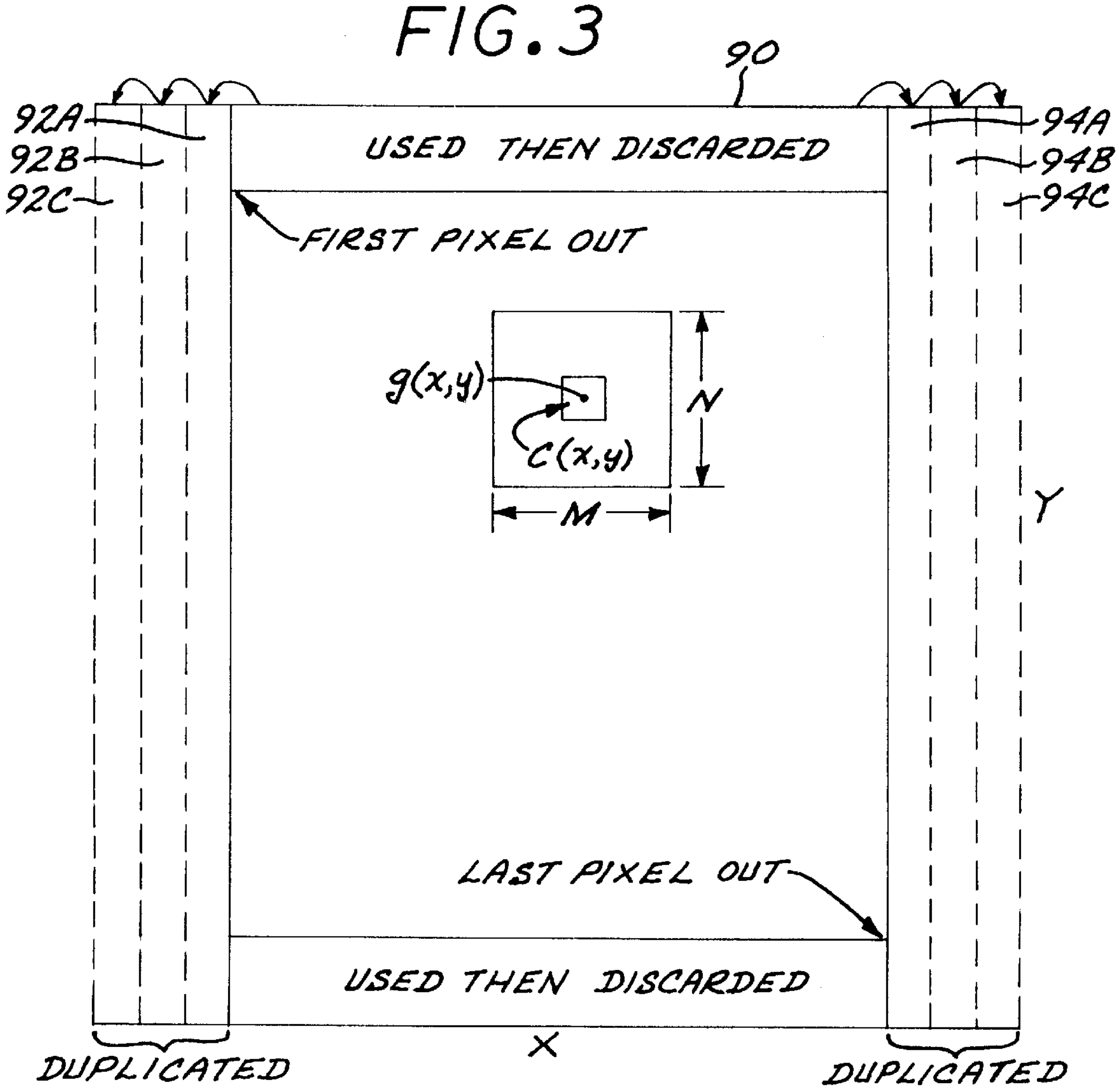
FIG. 3 is a diagrammatic depiction of an image frame undergoing convolution in accordance with the invention.

FIG. 3 is a diagrammatic depiction of an image frame undergoing convolution in accordance with the invention. The frame 90 is a set of pixel values, organized in rows and columns of pixel data. The first three and last three rows of data of the frame are used in the convolution processing, but are truncated discarded in the output image frame. For processing of frame pixels close to the left and right margins of the frame, the left most column of pixel values is replicated three times to form left boundary columns 92A, 92B and 92C. Similarly, the right most column of pixel values is replicated three times to form right boundary columns 94A, 94B and 94C. The left and right boundary columns of pixel data are used only for the convolution processing, and do not appear in the convolved output image frame. The output image frame, for an input image frame of Y rows and X columns, will have Y-6 rows and X columns of pixel data.

Figure 4:
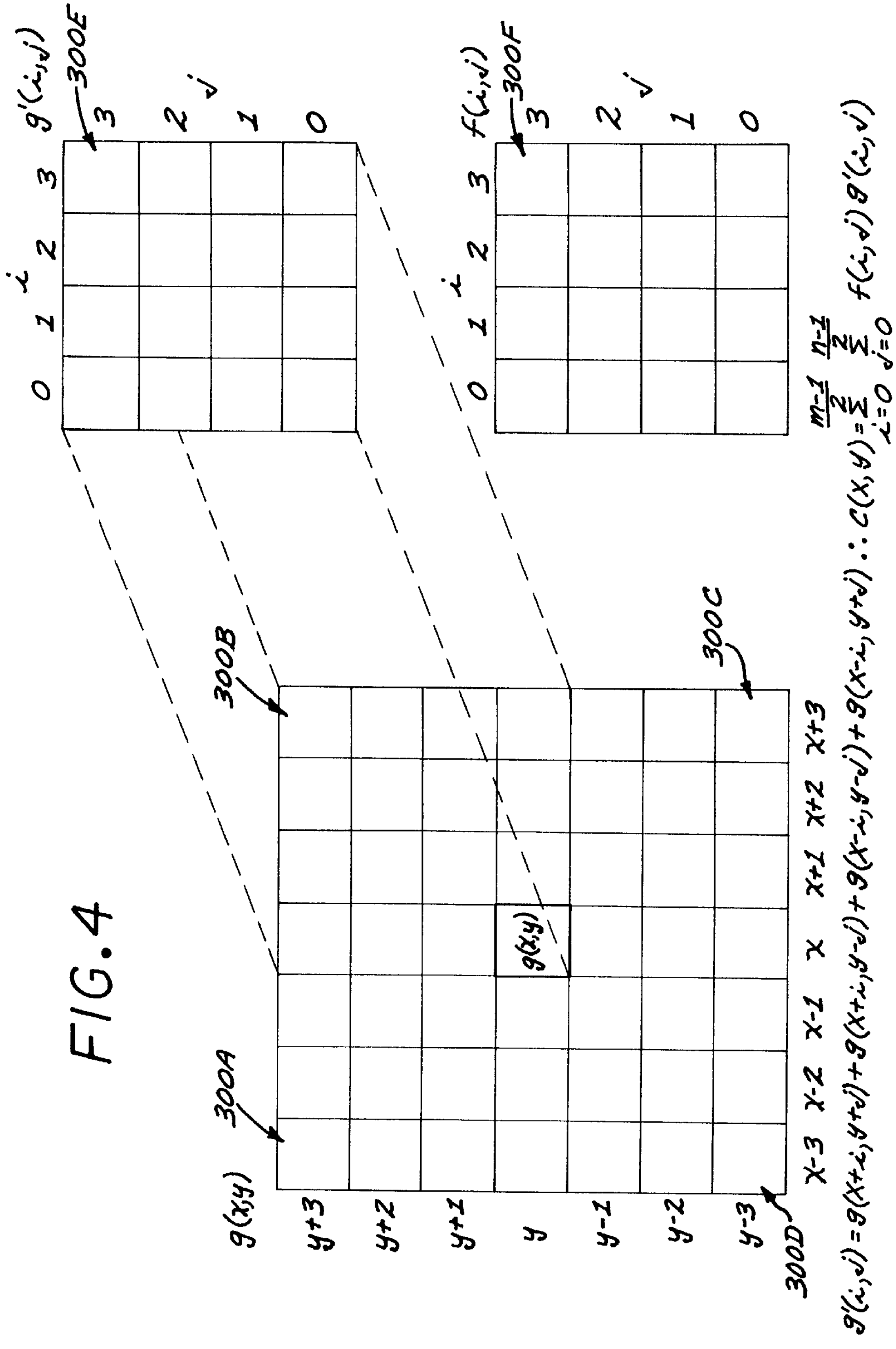
FIG. 4 is a diagrammatic depiction of the convolution processing for a single image pixel.

Assume that the filter mask size is M rows by N columns, where M=N=7. This size of course is merely exemplary, and other filter mask sizes can be used in this or other applications of the invention. Thus, for an input pixel value g(x,y), the filter mask will be applied to the surrounding input pixels values within the mask, using eq. 4 above. This is illustrated diagrammatically in FIG. 4, which is an enlargement of the area in the image frame of FIG. 3 at and immediately adjacent the representative pixel g(x,y). FIG. 4 shows the surrounding pixels which will be processed with the mask values to produce the convolved output pixel value c(x,y). In this case the filter mask size is 7 by 7 pixels, so that the sums for computing c(x,y) are formed over i=0 to 3, and j=0 to 3. There are a total of 16 multiplications conducted to obtain the convolved value. Four pixel values are summed to obtain each image value g'(i,j) which is multiplied by a corresponding mask value f(i,j) . This is diagrammatically shown in FIG. 4, where the values for g'(i,j) are depicted in a 4 by 4 array g'(i,j), and the corresponding mask values are depicted in a 4 by 4 array f(i,j). For example, for i=j=3, the four image pixel values located at the corners 300A, 300B, 300C and 300D of the frame portion shown in FIG. 4 are summed together to form a value at 300E, g'(3,3), and then multiplied by a corner mask value 300F, f(3,3). For the case of i=j=0, the pixel value g(x,y) can be summed four times and then multiplied by a mask value. Alternatively, for this special case, the sum operation can be omitted, and the mask value selected to obtain the desired result, to eliminate a sum operation.

Figure 5:
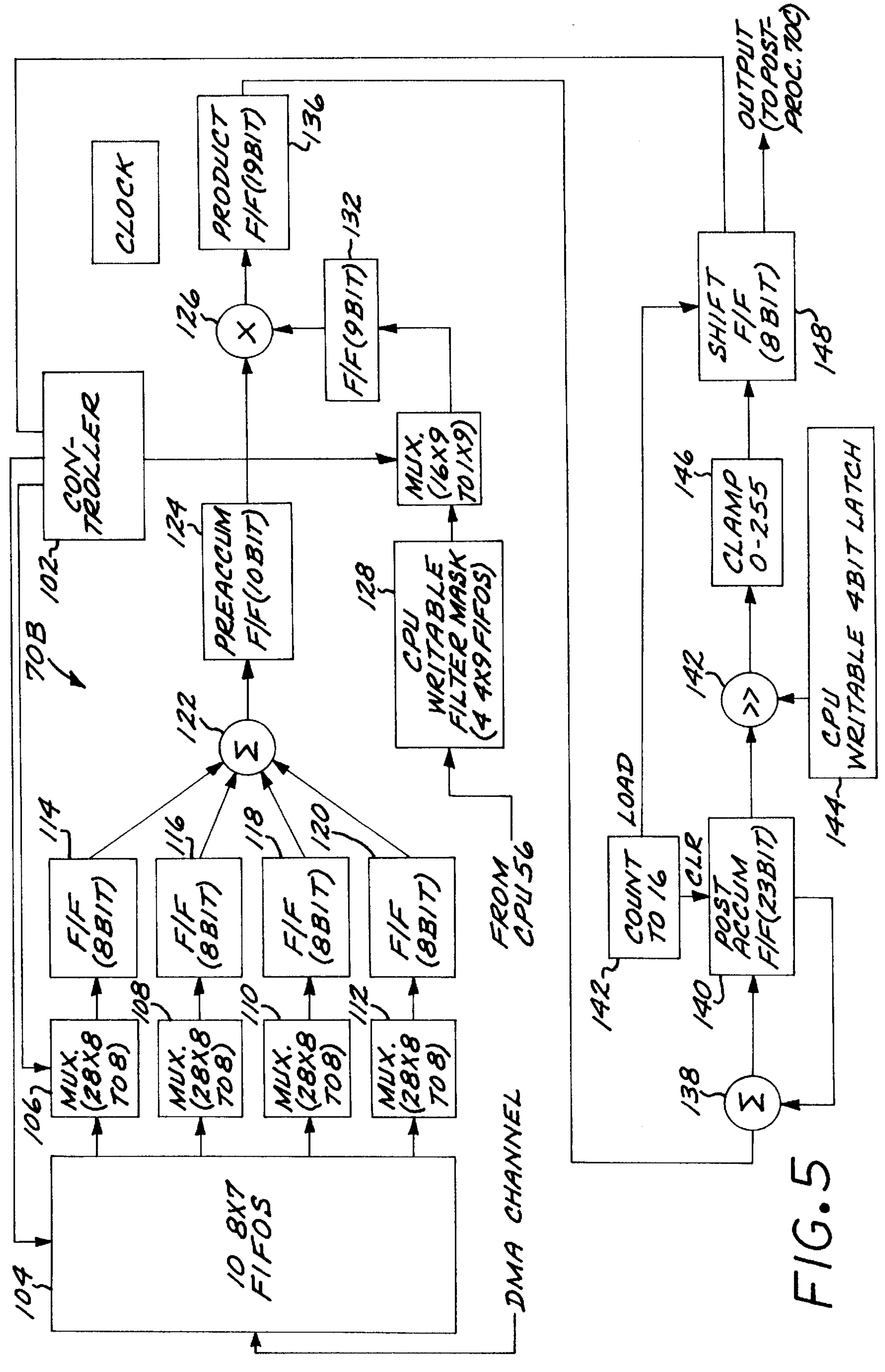
FIG. 5 is a schematic block diagram of an image processor for implementing image convolutions in accordance with the invention.

An exemplary mechanization of the convolution process in accordance with the invention is illustrated in FIG. 5. The image frame data provided from the scanner and the pre-processing function 70A is fetched, sections at a time, each section representing 10 pixel by 7 pixel sections, each pixel color represented by an 8-bit value, under control of the convolution controller 102, which in this exemplary embodiment is a state machine. The image frame data is obtained via a DMA (direct memory access) channel. In this exemplary embodiment, portions of 10 rows of pixel data are fetched at a time in order to permit processing of four pixels, i.e. the pixels centered in the 4th, 5th, 6th and 7th pixel row sections, with the results of one fetch operation. This improves the bandwidth utilization of the DMA channel. The fetched pixel data set is clocked into a FIFO (first-in-first-out) bank 104 comprising 10 8 bit by 7 bit FIFOs, under control of the controller 102. The data is selectively read out of the FIFO bank 104 into 4 multiplexers 106, 108, 110, 112, each for selecting one of 28 pixel values of corresponding positions within the four quadrants of a convolution filter mask. The selected pixel value for each quadrant is then clocked into a corresponding 8-bit flip-flop device 114, 116, 118 or 120. The flip-flop contents are subsequently clocked into a digital adder 122 and the sum is clocked into a preaccumulator flip/flop 124. The sum value for the four quadrant values is then clocked into multiplier stage 126 for a multiply operation with a predetermined, CPU writable filter mask value, provided through a FIFO bank 128, a multiplexer 130 and flip-flop 132. In this exemplary embodiment, the FIFO bank 128 comprises four 4 by 9 bit FIFO devices, the multiplexer 130 selects one of sixteen 9 bit values under control of a mask state machine 134, and provides the selected 9 bit value to a 9 bit flip-flop 132 for use in the multiplication process performed by device 126.

The product of the multiplication process is clocked into a product flip-flop 136 for subsequent summing at device 138 with an accumulated value stored in post-accumulator flip-flop 140. The product values are accumulated over 16 multiplication cycles, i.e. until all multiplications have been performed for a single quadrant of the filter mask. A counter 142 clears the flip-flop when 16 values have been accumulated. The final accumulated value is then clocked into device 142, a right shift function which shifts right by the number of bits stored in CPU-writable 4-bit latch 144 in this exemplary embodiment. This device shift right by 4 bits implements a division by a constant which is a power of 2. The mask resolution can be maximized if the constant is programmable. When creating the mask values, the divisor value can be selected to get the closest desired fractional value. The implementation illustrated in FIG. 5 is a fixed-point math implementation; providing the division function at 142 provides an effective fractional mask value with the integer math implementation. The result of the division is then clamped by clamp function 146 to a maximum value of 255, i.e. the output value must be between 0 and 255. The clamped output value is clocked into an 8-bit output flip-flop, and passed to the post-processor for subsequent processing.

Figure 6:
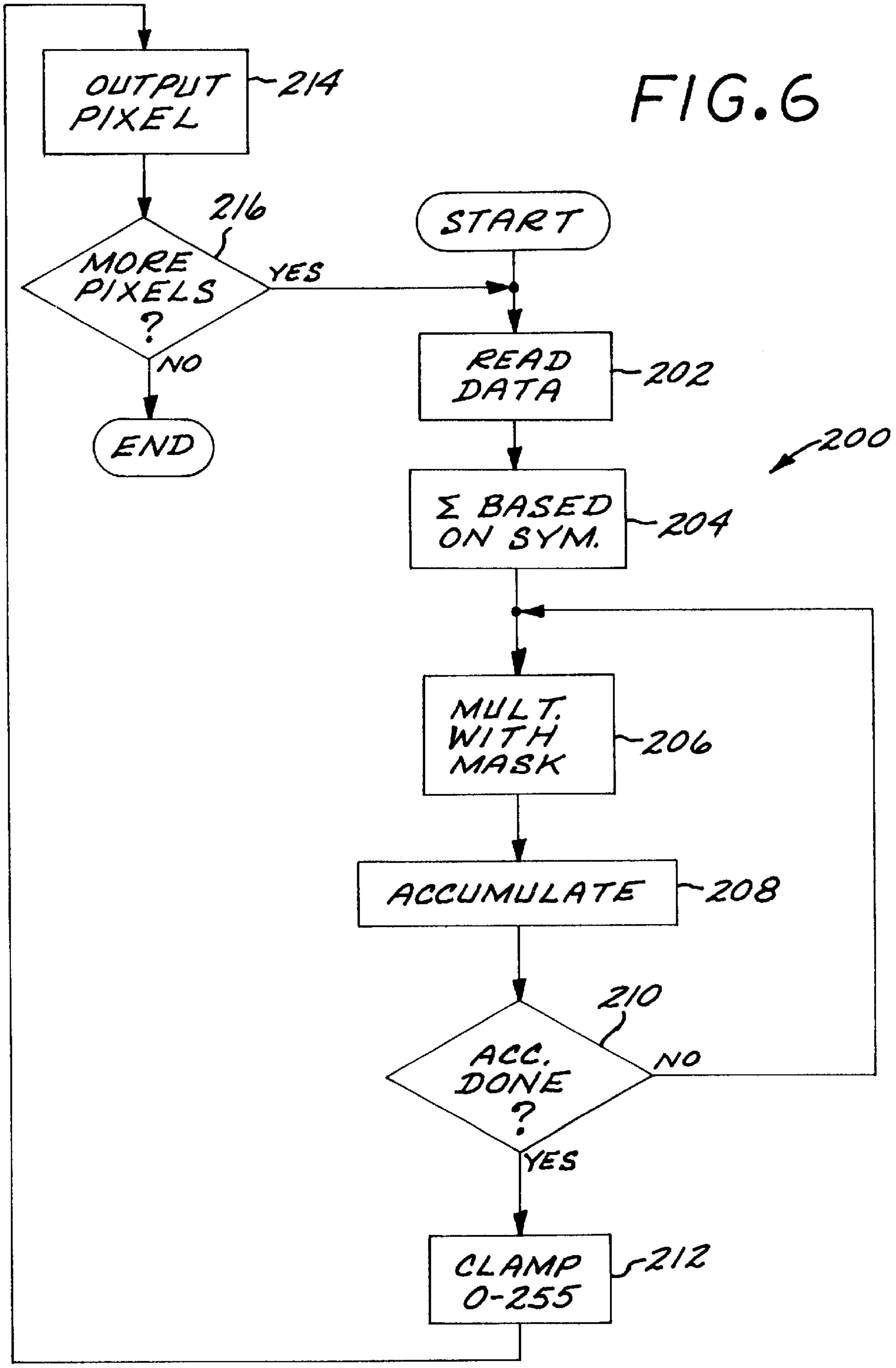
FIG. 6 is a simplified flow diagram of an exemplary image convolution in accordance with the invention.

FIG. 6 is a simplified flow diagram illustrating the convolution processing algorithm 200 implemented by the implementation of FIG. 5. At step 202, the input image data is read from the FIFO bank 104. At step 204, the sum of the image pixel data symmetrically located within the four quadrants is calculated, with the adder 122. Next at step 206, the sum is multiplied with the corresponding filter mask value by multiplier 126, and the resulting product is accumulated until all multiplications have been performed and the products accumulated for the pixel being convolved (steps 206, 208, 210), using adder 138 and flip-flop 140. The resulting value is limited to a maximum value (here 255) at step 212, and the convolved pixel value is output for subsequent processing. If all pixels in the image frame have not been processed, the operation branches to step 202 for the next image pixel. If all pixels comprising the frame have been processed, the convolution algorithm is completed for the image frame.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for convolving an image frame comprising a two-dimensional array of pixel values by a desired linear convolution mask that is symmetric in both cardinal directions, while reducing the number of multiply operations employed in the convolution, the array comprising R rows and C columns of pixels, the method comprising the following steps:

reading input image data including an image pixel value for an image pixel to be convolved and a set of image pixel values corresponding to a set of pixels surrounding the image pixel to be convolved;

forming respective first and second sets of boundary columns for the left and right edges of the image frame, wherein each column of said first set is a duplicate of the first column of the image frame, and each column of said second set is a duplicate of the last column of the image frame;

convolving said image pixel by applying a set of mask coefficients to the image pixel values for the pixel to be convolved and the set of surrounding pixels, said convolving step exploiting said symmetry in said convolution mask to employ only a reduced number of multiplication operations required by said convolving step to perform said convolution, wherein said boundary columns are employed to furnish pixel values for the set of surrounding pixels for convolving pixels located on or near the first and last columns of image pixels; and repeating the steps of reading input image data and convolving the image pixel for each pixel in a set of image pixels comprising the image frame to provide a convolved image frame, wherein a highly efficient convolution is obtained with efficient utilization of multiply operations.

2. A method for convolving an image frame according to claim 12, wherein said convolving step includes:

(i) selecting a first subset of said set of surrounding image pixels consisting of four corresponding image pixels from each quadrant disposed equidistantly from the image pixel to be convolved;

(ii) summing the pixel values of said subset of surrounding image pixels to form a summed value;

(iii) multiplying the summed value by a filter mask value corresponding to said subset to form a first product value;

(iv) selecting a subsequent subset of said set of surrounding image pixels consisting of four corresponding image pixels from each quadrant disposed equidistantly from the image pixel to be convolved and which have not already been selected to form a subset;

(v) summing the pixel values of said subsequent subset of surrounding image pixels to form a subsequent summed value;

(vi) multiplying the subsequent summed value by a filter mask value corresponding to said subsequent subset to form a second product value;

(vii) forming an accumulated value comprising the sum of the product values formed for each multiplication process; and (viii) repeating steps (iv) through (vii) to obtain an accumulated value formed from all pixels in the set of surrounding pixels.

3. The method of claim 2 wherein said convolving step further comprises applying a division factor to said accumulated value to obtain a convolved image pixel value.

4. The method of claim 3 wherein said division factor is an integer multiple of 2.

5. The method of claim 2 wherein in general the number of multiply operations is $(m+1)(n+1)/4$, where the pixel mask is m by n pixels in size.

6. The method of claim 2 wherein said image frame comprises R rows and C columns of pixels, the method further comprising the step of forming respective first and second sets of boundary columns for the left and right edges of the image frame, wherein each column of said first set is a duplicate of the first column of the image frame, and each column of said second set is a duplicate of the last column of the image frame, and wherein said boundary columns are employed during the convolving step to furnish pixel values for the set of surrounding pixels for convolving pixels located on or near the first and last columns of image pixels.

7. The method of claim 2 wherein the convolution mask is formed by mask coefficients $f(m,n)$, where $f(m,n)=f(-m,n)=f(m,-n)=f(-m,-n)$.

8. An image processor for processing a two-dimensional image array of pixel values, including apparatus for convolving said pixel values by a desired linear convolution mask that is symmetric in both cardinal directions, the processor comprising:

circuity for reading a block of input image data comprising the image frame, including an image pixel value for an image pixel to be convolved and a set of image pixel values corresponding to a set of pixels surrounding the image pixel to be convolved;

a first apparatus forming respective first and second sets of boundary columns for the left and right edges of the image frame, wherein each column of said first set is a duplicate of the first column of the image frame, and each column of said second set is a duplicate of the last column of the image frame;

second apparatus for applying a set of mask coefficients to the image pixel values for the pixel to be convolved and the set of surrounding pixels, said apparatus employing said boundary columns to furnish pixel values for the set of surrounding pixels for convolving pixels located on or near the first and last columns of image pixels, said apparatus adapted to exploit said symmetry in said convolution mask to employ only a reduced number of multiplication operation required by said convolving step to perform said convolution; and controller apparatus for controlling the reading circuitry, the first apparatus and the second apparatus for applying a set of mask coefficients to read successive blocks of input image data and convolve successive image pixels for each pixel in a set of image pixels comprising the image frame to provide a convolved image frame.

9. An image processor according to claim 13, wherein said set of surrounding image pixels includes pixels disposed in each quadrant of a two-dimensional mask set surrounding said image pixel to be convolved; and wherein said second apparatus includes:

(i) multiplexing circuitry for selecting a first subset of said set of surrounding image pixels consisting of four corresponding image pixels from each quadrant disposed equidistantly from the image pixel to be convolved;

(ii) digital adder circuitry for summing the pixel values of said subset of surrounding image pixels to form a summed value;

(iii) digital multiplier circuitry for multiplying the summed value by a filter mask value corresponding to said subset to form a product value; and (iv) an accumulator for summing the pixel values of said product values formed over the different subsets of surrounding image pixels to form a summed value.

10. The image processor of claim 9, wherein said second apparatus further comprises a digital circuit for applying a division factor to said accumulated value to obtain a convolved image pixel value.

11. The image processor of claim 10 wherein said division factor is an integer multiple of 2.

12. A method for convolving an image frame comprising a two-dimensional array of pixel values by a desired linear convolution mask that is symmetric in both cardinal directions, while reducing the number of multiply operations employed in the convolution, the method comprising the following steps:

reading input image data including an image pixel value for an image pixel to be convolved and a set of image pixel values corresponding to a set of pixels surrounding the image pixel to be convolved, wherein said set of surrounding image pixels includes pixels disposed in each quadrant of a two-dimensional mask set surrounding said image pixel to be convolved;

convolving said image pixel by applying a set of mask coefficients to the image pixel values for the pixel to be convolved and the set of surrounding pixels, said convolving step exploiting said symmetry in said convolution mask to employ only a reduced number of multiplication operations required by said convolving step to perform said convolution, said convolving step comprising:

(i) selecting a first subset of said set of surrounding image pixels consisting of four corresponding image pixels from each quadrant disposed equidistantly from the image pixel to be convolved;

(ii) summing the pixel values of said subset of surrounding image pixels to form a summed value;

(iii) multiplying the summed value by a filter mask value corresponding to said subset to form a first product value;

(iv) selecting a subsequent subset of said set of surrounding image pixels consisting of four corresponding image pixels from each quadrant disposed equidistantly from the image pixel to be convolved and which have not already been selected to form a subset;

(v) summing the pixel values of said subsequent subset of surrounding image pixels to form a subsequent summed value;

(vi) multiplying the subsequent summed value by a filter mask value corresponding to said subsequent subset to form a second product value;

(vii) forming an accumulated value comprising the sum of the product values formed for each multiplication process; and (viii) repeating steps (iv) through (vii) to obtain an accumulated value formed from all pixels in the set of surrounding pixels;

repeating the steps of reading input image data and convolving the image pixel for each pixel in a set of image pixels comprising the image frame to provide a convolved image frame, wherein a highly efficient convolution is obtained with efficient utilization of multiply operations;

wherein said image frame comprises R rows and C columns of pixels; and further comprising:

forming respective first and second sets of boundary columns for the left and right edges of the image frame;

wherein each column of said first set is a duplicate of the first column of the image frame; and wherein each column of said second set is a duplicate of the last column of the image frame; and wherein said boundary columns are employed during the convolving step to furnish pixel values for the set of surrounding pixels for convolving pixels located on or near the first and last columns of image pixels.

* * * * *